US007328093B1

(12) United States Patent
Gessner et al.

(10) Patent No.: US 7,328,093 B1
(45) Date of Patent: Feb. 5, 2008

(54) COMBINATION SCAN TOOL AND INSPECTION TOOL

(75) Inventors: Michael Gessner, Akron, OH (US); Robert Roberts, South Euclid, OH (US); Thomas Bertosa, Chardon, OH (US); Hamid Namaky, South Russell, OH (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 11/700,018

(22) Filed: Jan. 31, 2007

(51) Int. Cl.
*G01M 17/00* (2006.01)
(52) U.S. Cl. ............................ 701/29; 701/32; 701/35
(58) Field of Classification Search ............ 701/29-35; 340/438, 439
See application file for complete search history.

(56) References Cited

U.S. PATENT DOCUMENTS 6,526,340 B1 * 2/2003 Reul et al. .................... 701/29
6,701,233 B2 3/2004 Namaky et al.
7,069,125 B2 6/2006 Namaky et al.

OTHER PUBLICATIONS http://www.actron.com/product_detail.php?pid=16317, Nov. 29, 2006, pp. 1-3.
David Sosnowski and Edward Gardetto (Transportation and Regional Programs Division, Office of Transportation and Air-Quality-U.S. Environmental Protection Agency), "Performing Onboard Diagnostic System Checks as Part of a Vehicle Inspection and Maintenance Program," Jun. 2001, whole document.

* cited by examiner

*Primary Examiner*—Richard M. Camby
(74) *Attorney, Agent, or Firm*—Baker & Hostetler LLP

(57) ABSTRACT

A diagnostic tool and method are provided wherein the diagnostic tool can function as an inspection tool and a scan tool. The diagnostic tool determines if it is authorized for an inspection and then functions as an inspection tool and does not allow the scan tool function until the inspection is completed or voided. A software of the diagnostic tool includes a shared code, an inspection tool mode and a scan tool mode. The scan tool code and the inspection code are not shared so that updating of one code does not affect the code of the other.

20 Claims, 3 Drawing Sheets

COMBINATION SCAN TOOL AND INSPECTION TOOL

FIELD OF THE INVENTION

The present invention relates generally to an automotive diagnostic tool. More particularly, the present invention relates to an automotive diagnostic tool capable of functioning as a scan tool and an inspection tool.

BACKGROUND OF THE INVENTION

Modern vehicles typically have one or more diagnostic systems, generally having separate computer control modules to control various functions of the vehicle. Some examples include powertrain control module (PCM), engine control module (ECM), a transmission control module (TCM), anti-locking brake system (ABS), and an air bag control module. The vehicle diagnostic systems often have self-diagnostic capability to detect and alert the driver of problems the vehicle may be encountering. When a problem is found, a diagnostic trouble code or DTC, is set within the computer's memory. DTCs are as general or as specific as the manufacturer desires.

To retrieve and decipher DTCs, an auto repair technician needs a diagnostic tool, such as a scan tool. The scan tool must, therefore, be connected to the vehicle's computer bus system to access and retrieve the DTCs. Scan tools are testing devices that interface with vehicle diagnostic systems to retrieve information from the various control modules. The scan tools are equipped to communicate in various communication protocols such as Controller Area Network (CAN), J1850 VPM and PWM, ISO 9141, Keyword 2000 and others. These communications protocols may be specific to the various automobile manufacturers. The scan tool will help the technician to diagnose and repair the vehicle based on the information the tool retrieves from it.

Another type of diagnostic system is On-Board Diagnostic II (OBD II). OBD II monitors all engine and drive train sensors and actuators for shorts, open circuits, lazy sensors and out-of-range values as well as values that do not logically fit with other powertrain data. Thus, OBD II keeps track of all of the components responsible for emissions and when one of them malfunctions, it signals the vehicle owner by illuminating a Maintenance Indicator Lamp (MIL), such as a check engine indicator. It also stores DTCs designed to help a technician find and repair the emission related problems.

The Clean Air Act of 1990 requires inspection and maintenance (I/M) programs to incorporate OBD II testing as part of a vehicle's emissions inspection program. When fully implemented, 1996 and newer model year vehicles registered in a required emission test area must be tested annually. If DTCs are present, or the diagnostic monitor software has not adequately tested the vehicle's emission control systems, the vehicle fails the emissions test. Otherwise, the vehicle passes the emissions test.

In some states, a garage can perform I/M testing along with vehicle repairs. However, the technician will use one tool for diagnostic and repair issues and another tool to perform I/M testing. The cost of purchasing both tools can be expensive for a garage, particular if it is a small independent garage.

Accordingly, it is desirable to provide a method and apparatus that allow a diagnostic tool to perform both diagnostic and I/M inspection testing.

SUMMARY OF THE INVENTION

The foregoing needs are met, to a great extent, by the present invention, wherein in one aspect an apparatus is provided that in some embodiments allows a diagnostic tool to function as a scan tool and inspection tool.

In accordance with one embodiment of the present invention, a diagnostic tool is provided which includes a processor that can operate a software that can include a shared code, an inspection tool code and a scan tool code, a memory that can store the software used by the processor, a connector interface that can connect the diagnostic tool to a data link connector in a vehicle, a signal translator that can allow the diagnostic tool to communicate with the vehicle in at least one communication protocol, an input device for inputting information into the diagnostic tool, a display that can display information to a user, and a housing surrounding the processor, the memory, the connector interface, the signal translator, the input device and the display, wherein the inspection tool code and the scan tool code are not shared.

In accordance with another embodiment of the present invention, a method of operating a diagnostic tool is provided and can include providing the diagnostic tool having a software that can include a shared code, an inspection tool code and a scan tool code, wherein the diagnostic tool can function as an inspection tool or as a scan tool, determining whether the diagnostic tool is authorized for an inspection, and setting up an interrupt vector relay table for the inspection tool code if the diagnostic tool is authorized for an inspection or for the scan tool code if the diagnostic tool is not authorized for the inspection, wherein the inspection tool code and the scan tool code are not shared.

In accordance with yet another embodiment of the present invention, a diagnostic tool is provided, which can include a means for processing that processes a software that can include a shared code, an inspection tool code and a scan tool code, a means for storing that stores the software used by the means for processing, a means for connecting that can connect the diagnostic tool to a data link connector in a vehicle, a means for translating that can allow the diagnostic tool to communicate with the vehicle in at least one communication protocol, a means for inputting that can allow a user to input information into the diagnostic tool, a means for displaying that can display information to the user, and a means for housing surrounding the means for processing, the means for storing, the means for connecting, the means for translating, the means for inputting and the means for displaying, wherein the inspection tool code and the scan tool code are not shared.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
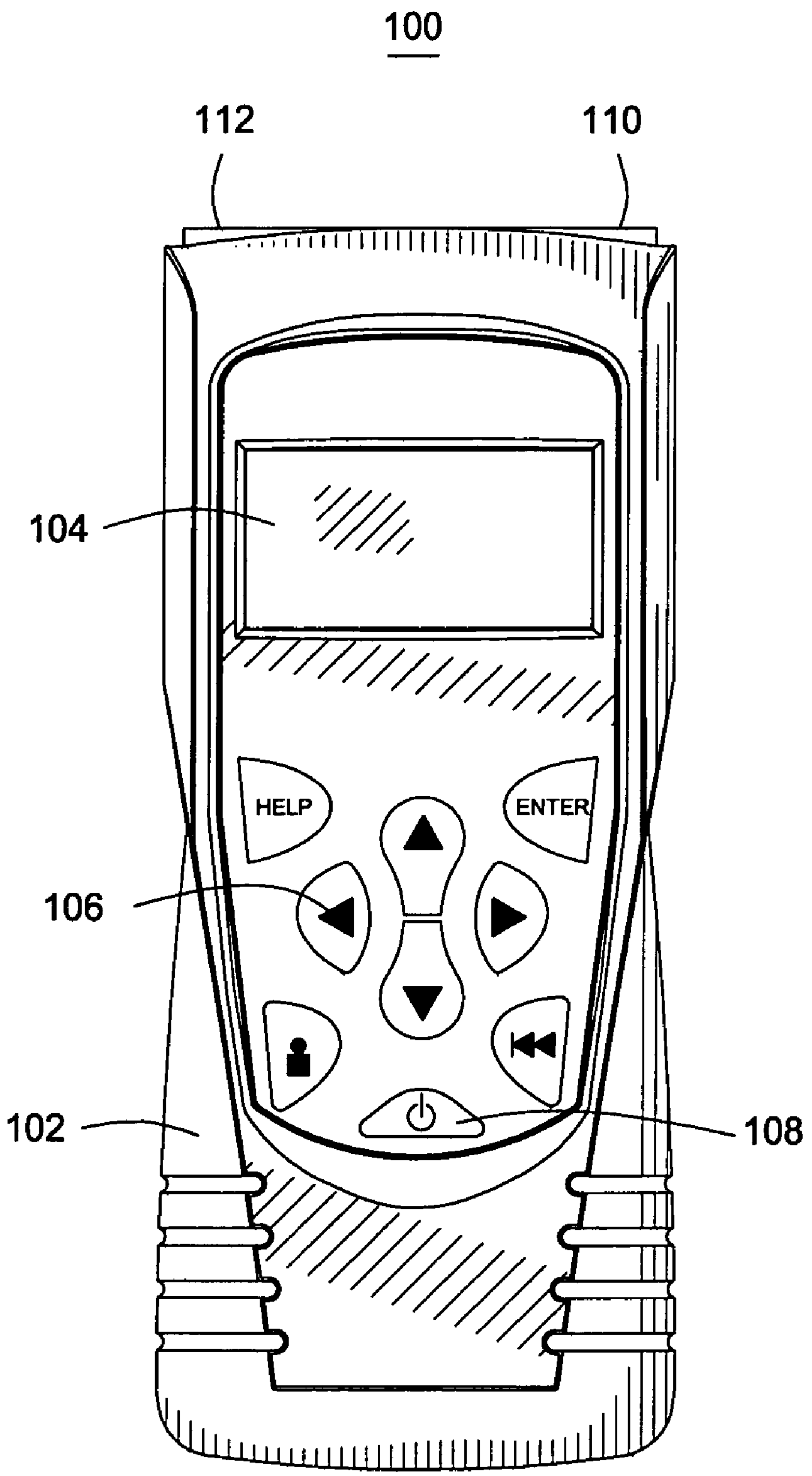
FIG. 1 is a front view illustrating a diagnostic tool according to an embodiment of the invention.

The invention will now be described with reference to the drawing figures, in which like reference numerals refer to like parts throughout. An embodiment in accordance with the present invention provides an apparatus and method that can conduct I/M testing and diagnostic for vehicle repairs.

An embodiment of the present inventive apparatus is illustrated in FIG. 1. In particular, FIG. 1 is a front view illustrating a diagnostic tool 100 according to an embodiment of the invention. The diagnostic tool 100 can be any computing device, such as, for example, the Nemisys diagnostic tool from Service Solutions (a unit of the SPX Corporation) in Owatonna, Minn. or Elite Autoscanner® Pro CP9190 from Actron also a unit of Service Solutions. The diagnostic tool 100 includes a housing 102 to house the various components of the diagnostic tool, such as a display 104, a user interface 106, a power key 108, a memory card reader 110 (optional) and a connector interface 112. The display 104 can be any display, for example, LCD (liquid crystal display), VGA (video graphics array), touch display (can also be a user interface), etc. The user interface 106 allows the user to interact with the diagnostic tool in order to operate the diagnostic tool as desired. The user interface 106 can include function keys, arrow keys or any other type of keys that can manipulate the diagnostic tool 100 in order to operate various menus that are presented on the display. The input device 106 can also be a mouse or any other suitable input device, including a keypad. The user interface 106 can also include numbers or be alphanumeric. The power key 108 allows the user to turn the diagnostic tool 100 on and off, as required.

Memory card reader 110 can be a single type card reader, such as a compact flash card, floppy disc, memory stick, secure digital, flash memory or other types of memory. The memory card reader 110 can be a reader that reads more than one of the aforementioned memory such as a combination memory card reader. Additionally, the memory card reader 110 can also read any other computer readable medium, such as CD, DVD, UMD, etc.

The connector interface 112 allows the diagnostic tool 100 to connect to an external device, such as an ECU of a vehicle, a computing device, an external communication device (such as a modem), a network, etc. through a wired or wireless connection. Connector interface 112 can also include a USB, FIREWIRE, modem, RS232, RS485, and other connections to communicate with external devices, such as a hard drive, USB drive, CD player, DVD player, UMD player or other computer readable medium devices.

Figure 2:
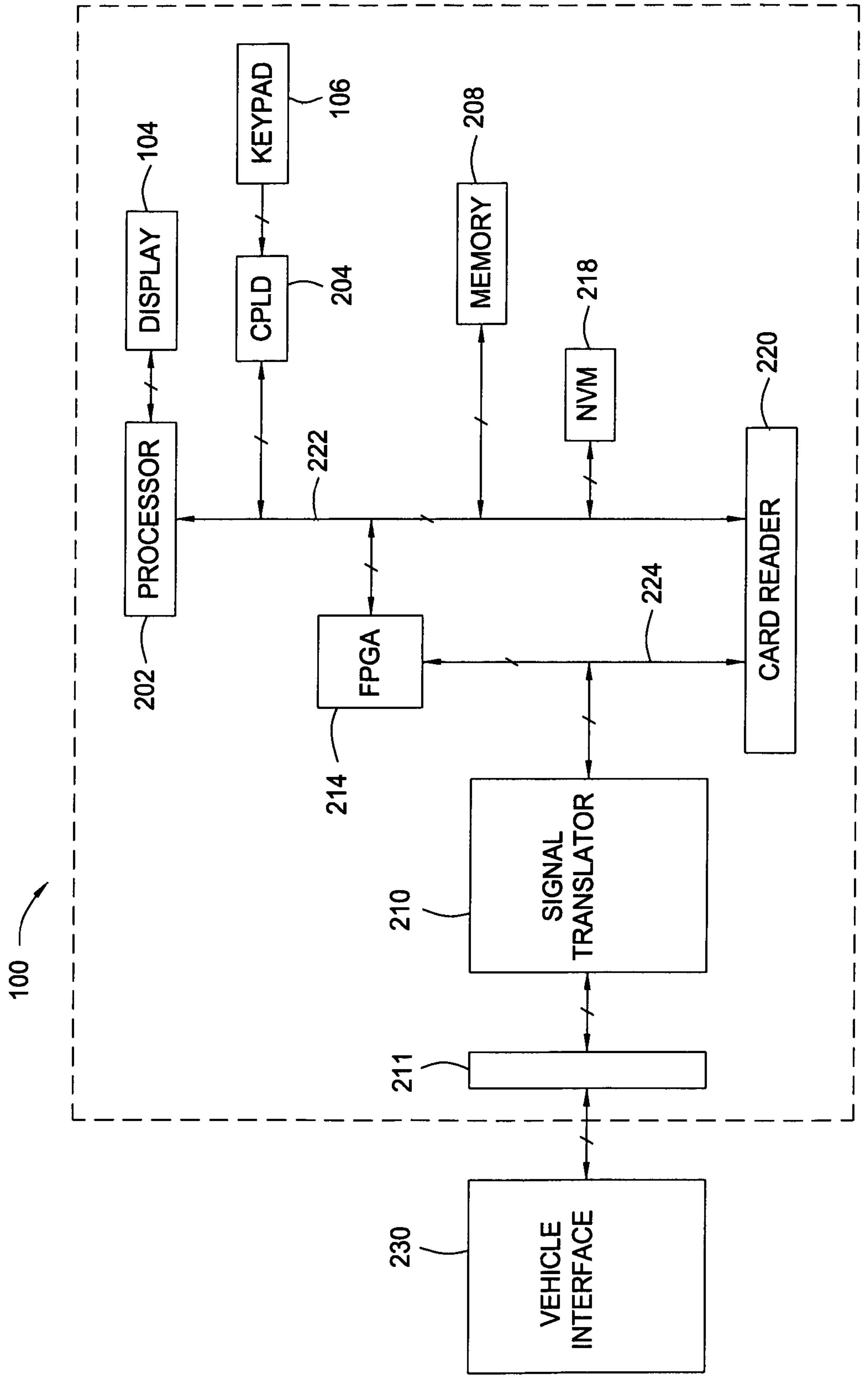
FIG. 2 is a block diagram of the components of a diagnostic tool.

FIG. 2 is a block diagram of the components of the diagnostic tool 100. In FIG. 2, the diagnostic tool 100 according to an embodiment of the invention includes a processor 202, a field programmable gate array (FPGA) 214, a first system bus 224, the display 104, a complex programmable logic device (CPLD) 204, the user interface in the form of a keypad 106, a memory subsystem 208, an internal non-volatile memory 218, a card reader 220, a second system bus 222, a connector interface 211, and a selectable signal translator 210. A vehicle communication interface 230 is in communication with the diagnostic tool 100 through connector interface 211 via an external cable (not shown). The diagnostic tool includes all the components that allow the diagnostic tool to function as a scan tool and/or an inspection tool.

Selectable signal translator 210 communicates with the vehicle communication interface 230 through the connector interface 211. Signal translator 210 conditions signals received from an ECU unit through the vehicle communication interface 230 to a conditioned signal compatible with diagnostic tool 100. Signal translator 210 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4), OBD II or other communication protocols that are implemented in a vehicle.

The circuitry to translate and send in a particular communication protocol can be selected by FPGA 214 (e.g., by tri-stating unused transceivers) or by providing a keying device that plugs into the connector interface 211 that is provided by diagnostic tool 100 to connect diagnostic tool 100 to vehicle communication interface 230. Signal translator 210 is also coupled to FPGA 214 and the card reader 220 via the first system bus 224. FPGA 214 transmits to and receives signals (i.e., messages) from the ECU unit through signal translator 210.

The FPGA 214 is coupled to the processor 202 through various address, data and control lines by the second system bus 222. FPGA 214 is also coupled to the card reader 220 through the first system bus 224. The processor 202 is also coupled to the display 104 in order to output the desired information to the user. The processor 202 communicates with the CPLD 204 through the second system bus 222. Additionally, the processor 202 is programmed to receive input from the user through the user interface 106 via the CPLD 204. The CPLD 204 provides logic for decoding various inputs from the user of diagnostic tool 100 and also provides glue-logic for various other interfacing tasks.

Figure 3:
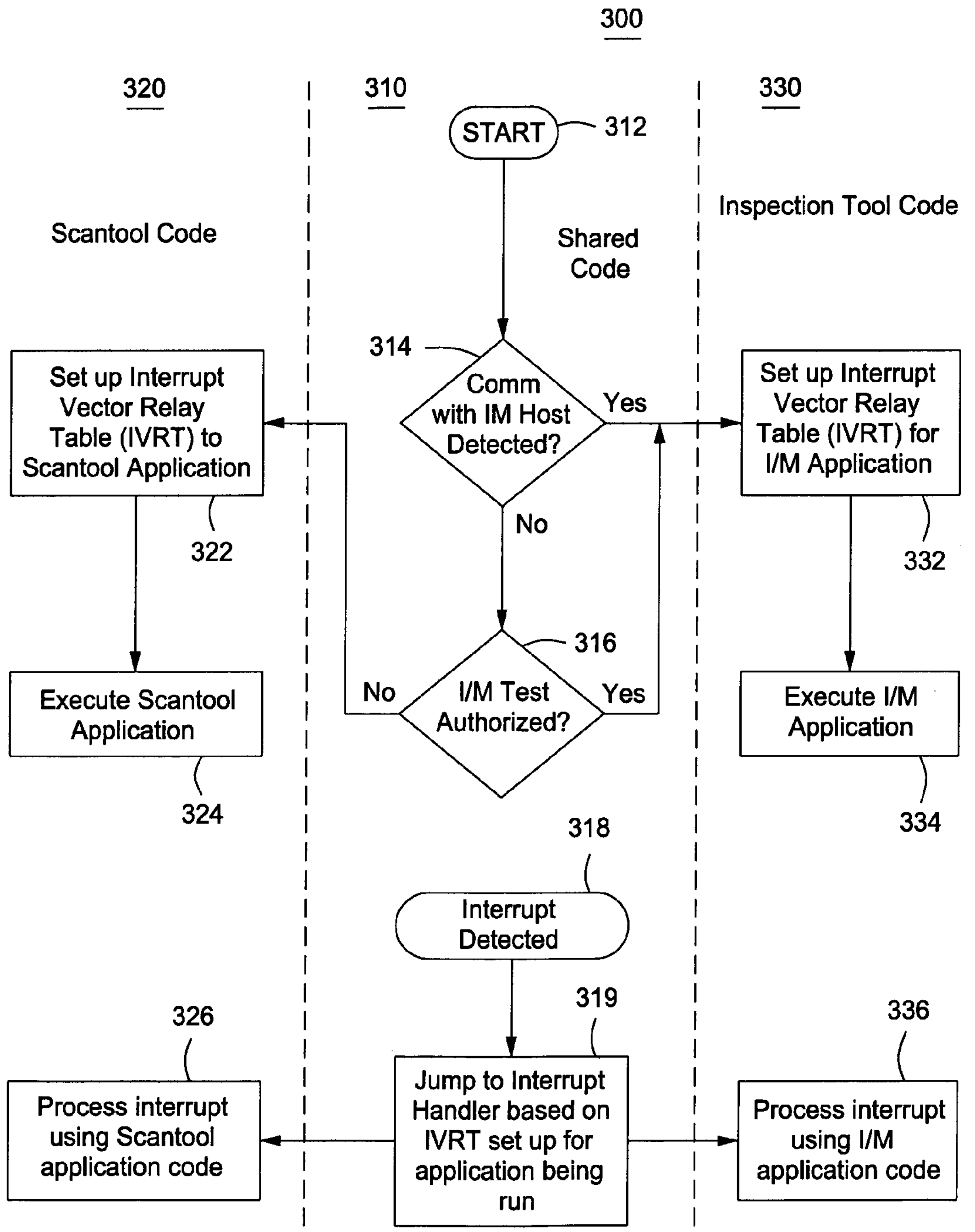
FIG. 3 is software system architecture according to an embodiment of the invention.

Memory subsystem 208 and internal non-volatile memory 218 are coupled to the second system bus 222, which allows for communication with the processor 202 and FPGA 214. Memory subsystem 208 can include an application dependent amount of dynamic random access memory (DRAM), a hard drive, and/or read only memory (ROM). Software to run the diagnostic tool 100 can be stored in the memory subsystem 208, including any database. The software as shown in FIG. 3, can be divided into a shared code, an inspection tool code and a scan tool code. The scan tool code and the inspection code are not shared so that if one of the code is updated, the other code is not affected. The software can also be stored on an external memory, such as a compact flash card or other memories.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 214, memory 218 can contain downloadable images so that FPGA 214 can be reconfigured for a different group of communication protocols.

FIG. 3 is a software organization chart 300 of an embodiment of the invention. The software can be divided into three sections of code: (1) shared code 310; (2) scan tool code 320; and (3) inspection tool code 330. The scan tool code and the inspection tool code are not shared. Conventionally, when codes for various applications (scan and inspection) are shared, an update to one portion of the codes can affect the other portion of the codes or affect a shared device driver or dynamic-link-library (DLL), thereby causing the un-updated version or even the updated version not to function properly. Because the scan tool and inspection tool codes are not shared, this minimizes or eliminates any compatible issues that may arise when one code is updated and the other is not. Additionally, since the respective codes are not shared, updating one code will be easier to code than if the software coder had to worry about affecting the code of another distinct application. The compatible issues can occur at start up or when interrupts occur. A solution to these compatible issues will be further addressed below.

At step 312, the diagnostic tool 100 can be powered up by pressing the power button. Then the software can proceed to step 314, where the software determines if the diagnostic tool 100 is in communication with an I/M host. The I/M host can be a computing device, such as a personal computer that may be attached to a local printer and networked to other computing devices. The I/M host can authorize the diagnostic tool to act as an inspection tool in order to conduct an inspection. If yes, then the software proceeds to the inspection tool code section 330 and sets up the interrupt vector relay table (IVRT) for the I/M application. If the diagnostic tool is detected to be hooked to the I/M host, the software will automatically allow the tool to go into inspection mode.

When an interrupt occurs, processing of the application that is running is temporarily suspended, and another piece of the application code (interrupt handler) is executed. Then the processing of the application is resumed. At step 332, the IVRT is then populated with the addresses of the functions that should be executed when an interrupt occurs while the diagnostic tool functions as an inspection tool. This allows the software to know where to go in the inspection tool code when an interrupt occurs. Additionally, when an interrupt occurs during the I/M application, the table points only to the relevant portion of the inspection tool code and not to the scan tool code so that any updates to the scan tool code do not interfere with the IVRT or the inspection tool code.

At step 334, the software then executes the I/M application so that inspection of the vehicle can be conducted via the OBDII system. The I/M application can include the tests related to the OBDII system. The OBDII test helps to determine if the vehicle will pass or fail the inspection.

The I/M test can include a visual check to see if the MIL is illuminated and then an electronic examination with the diagnostic tool 100. The electronic examination includes determining the vehicle readiness status. The OBDII can monitor the status of up to 11 emission control monitors. However, not all the monitors are required to be "Ready" in order to pass due to varying state dependent requirements. Additionally, the diagnostic tool 100 can determine if any DTCs are set with the MIL illuminated. If the DTCs are set, then repairs are needed in order to be able to clear the DTCs and for the vehicle to pass the inspection.

Returning to step 314, if no I/M host is detected, then the software proceeds to step 316, where the software determines if an I/M test has been previously authorized for the diagnostic tool 100. If yes, then the software proceeds to step 332 and proceeds as discussed above. The I/M test must be completed or voided in order for the diagnostic tool to function in scan tool mode. This prevents the user from using the scan tool during inspection to clear DTCs in order to attempt to pass the vehicle. Additionally, at each power up of the diagnostic tool, the software inquires the tool to see if it's still in the I/M mode, so that the scan tool mode is prevented until the I/M testing is completed or voided. If no, then the software proceeds to step 322 on the scan tool code section 320.

At step 322, similar to step 332, the IVRT is then populated with the addresses of the functions that should be executed when an interrupt occurs while the diagnostic tool is functioning as a scan tool. This allows the software to know where to go in the scan tool code when an interrupt occurs. Additionally, when an interrupt occurs during the scan tool application, the table points only to the relevant portion of the scan tool code and not to the inspection tool code and that any updates to the inspection tool code does not interfere with the IVRT or the scan tool code.

After the IVRT table is properly populated, the software executes the scan tool application. At this point, the diagnostic tool 100 will function as a scan tool to diagnose any problems with the vehicle, including any problems that may have caused the vehicle to fail the I/M. The scan tool can communicate in the various communication protocol (discussed above) once it mates with the DLC of the vehicle.

At step 318, an interrupt is detected by the diagnostic tool 100 when one of the applications is running. Once the interrupt is detected, the software proceeds to step 319 and WRT will determine where to go in the appropriate code depending on which application is running. If the inspection code is running, then the software will proceed to step 336, where the process interrupt uses the designated inspection code. If the scan tool code is running then the software proceeds to step 326, where the process interrupt uses the designated scan tool code.

As stated above, the data collected from the vehicle can be separately stored. In one embodiment, the diagnostic tool 100 can verify data so that fraud does not occur. The data can be tied to one testing station or even the vehicle under test so that the same data can not be used to pass another vehicle.

In another embodiment of the invention, the data for the respective applications of the diagnostic tool can be stored with the respective application and are not shared. In other words, the data for scanning application can be stored in the same memory as the scanning application, while the data for the I/M testing can be stored in the same memory as the inspection application.

The above described method is done in the tool via software, however, hardware or hardware and software combination to carry out the method is also contemplated. All the steps described here do not have to be performed in order, variations of the order of the steps are also contemplated.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for diagnosing a vehicle, comprising:
a processor that operates a software that includes a shared code, an inspection tool code and a scan tool code;
a memory that stores the software used by the processor;
a connector interface that connects the diagnostic tool to a data link connector in the vehicle;
a signal translator that allows the diagnostic tool to communicate with the vehicle in at least one communication protocol;
an input device for inputting information into the diagnostic tool;
a display that displays information to a user; and
a housing surrounding the processor, the memory, the connector interface, the signal translator, the input device and the display, wherein the inspection tool code and the scan tool code are not shared.

2. The diagnostic tool of claim 1 further comprising an interrupt vector relay table that is populated based on if the diagnostic tool is functioning as a scan tool or as an inspection tool.

3. The diagnostic tool of claim 1, wherein the scan tool code allows the diagnostic tool to function as a scan tool and when the scan tool code is updated, the inspection tool code is not affected.

4. The diagnostic code of claim 1, wherein the inspection tool code allows the diagnostic tool to function as an inspection tool and when the inspection tool code is updated, the scan tool code is not affected.

5. The diagnostic tool of claim 2, wherein an interrupt allows for exception in the software to be performed for a period of time.

6. The diagnostic tool of claim 1, wherein the software determines if the diagnostic tool has been authorized to perform an inspection before the software allows the diagnostic tool to function as a scan tool.

7. The diagnostic tool of claim 1, wherein the diagnostic tool is an inspection tool and a scan tool.

8. A method of operating a diagnostic tool that diagnoses a vehicle, comprising:
providing the diagnostic tool having a software that includes a shared code, an inspection tool code and a scan tool code, wherein the diagnostic tool can function as an inspection tool or as a scan tool;
determining whether the diagnostic tool is authorized for an inspection of the vehicle; and
setting up an interrupt vector relay table for the inspection tool code if the diagnostic tool is authorized for an inspection or for the scan tool code if the diagnostic tool is not authorized for the inspection, wherein the inspection tool code and the scan tool code are not shared.

9. The method of claim 8, further comprising preventing the diagnostic tool from functioning as a scan tool until the inspection tool has completed the inspection or when the inspection is voided.

10. The method of claim 8, further, wherein the diagnostic tool is automatically authorized to conduct an inspection when the diagnostic tool is in communication with an inspection host computer.

11. The method of claim 8 further comprising:
receiving an interrupt and proceeding to the inspection tool interrupt vector relay table if the inspection is authorized or proceeding to the scan tool interrupt vector relay table if the inspection is not authorized.

12. The method of claim 8, wherein determining whether the diagnostic tool is authorized for the inspection occurs at every power up.

13. The method of claim 8, further comprising:
storing an inspection data received from the inspection tool separate from scan tool data received from the scan tool.

14. A diagnostic tool that diagnoses a vehicle, comprising:
a means for processing that processes a software that includes a shared code, an inspection tool code and a scan tool code;
a means for storing that stores the software used by the means for processing;
a means for connecting that connects the diagnostic tool to a data link connector in the vehicle;
a means for translating that allows the diagnostic tool to communicate with the vehicle in at least one communication protocol;
a means for inputting that allows a user to input information into the diagnostic tool;
a means for displaying that displays information to the user; and
a means for housing surrounding the means for processing, the means for storing, the means for connecting, the means for translating, the means for inputting and the means for displaying, wherein the inspection tool code and the scan tool code are not shared.

15. The diagnostic tool of claim 14 further comprising an interrupt vector relay table that is populated based on if the diagnostic tool is functioning as a scan tool or as an inspection tool.

16. The diagnostic tool of claim 14, wherein the scan tool code allows the diagnostic tool to act as a scan tool and when the scan tool code is updated, the inspection tool code is not affected.

17. The diagnostic tool of claim 14, wherein the inspection tool code allows the diagnostic tool to act as an inspection tool and when the inspection tool code is updated, the scan tool code is not affected.

18. The diagnostic tool of claim 15, wherein an interrupt allows for exception in the software to be performed.

19. The diagnostic tool of claim 14, wherein the software determines if the diagnostic tool has been authorized to perform an inspection before the software allows the diagnostic tool to function as a scan tool.

20. The diagnostic tool of claim 14, wherein the diagnostic tool is an inspection tool and a scan tool.

* * * * *